United States Patent [19]
Craig et al.

[11] 3,902,364
[45] Sept. 2, 1975

[54] APPARATUS FOR DETECTING AN ENLARGED SECTION OF A CONTINUOUSLY MOVING ELONGATED MATERIAL

[75] Inventors: John Nicholas Craig, Schenectady; Carl Warren Woodson, Ballston Lake, both of N.Y.

[73] Assignee: General Electric Company, New York, N.Y.

[22] Filed: Dec. 10, 1973

[21] Appl. No.: 423,236

[52] U.S. Cl. ................................. 73/160; 73/37.7
[51] Int. Cl.² ........................................ G01N 19/08
[58] Field of Search ...... 73/160, 37.7, 159, 388 BN; 137/82

[56] References Cited
UNITED STATES PATENTS

| | | | |
|---|---|---|---|
| 2,188,754 | 1/1940 | Keeler | 73/160 |
| 2,242,889 | 5/1941 | Keeler | 73/160 |
| 3,447,555 | 6/1969 | Jenney | 137/82 |

*Primary Examiner*—S. Clement Swisher
*Assistant Examiner*—Denis E. Corr
*Attorney, Agent, or Firm*—S. A. Young; W. C. Bernkopf

[57] ABSTRACT

An apparatus for detecting an enlarged section of a continuously moving elongated material. The apparatus includes a sensor member, a flapper member, a spring, and a fluidic coupling device. The sensor member has an open ended slot therein dimensioned to allow all of the elongated material to pass therethrough except for the enlarged section to be detected. One end of the sensor member has a relatively larger opening which is contiguous with one end of the slot for allowing the enlarged section of the elongated material to pass through the larger opening. The spring biases the sensor member in a direction opposite the direction of movement of the elongated material. The fluidic coupling device has an input port for receiving a fluid jet, a first output port adjacent to the flapper member, and a second output port for coupling a portion of the fluid jet to a monitoring device, which portion is inversely proportional to the remainder of the fluid jet exiting the first output port. Means is also provided for mounting the sensor member to pivotally move when the sensor member is contacted by the enlarged section of the elongated material which is not passable through the slot. The flapper member is mechanically coupled to the sensor member, and moves, in response to movement of the sensor member, away from the first output port, whereby the pressure of the fluid jet at the second output port decreases sufficiently to cause actuation of the monitoring device as the enlarged section of the elongated material moves through the larger opening adjacent the slot in the sensor member.

6 Claims, 4 Drawing Figures

PATENTED SEP 2 1975　　　　　　　　　　3,902,364

APPARATUS FOR DETECTING AN ENLARGED SECTION OF A CONTINUOUSLY MOVING ELONGATED MATERIAL

BACKGROUND OF THE INVENTION

1. Field of the Invention

This invention relates to an apparatus for detecting an enlarged section of a continuously moving elongated material, such as monofilament or multifilament yarn, insulated or bare wire or the like.

2. Description of the Prior Art

During the manufacture of wire in a mill, the wire is usually coated with some form of insulation as it is drawn through the mill. There are times when an enlarged section is formed by an undesirable buildup in insulation which adheres to the wire at a localized point. This buildup in insulation is wasteful, and can cause the wire size to exceed its specification.

Furthermore, if the enlarged section is allowed to move through the mill line undetected, it may cause damage to other equipment being used. For example, wire mill lines often use fluidic gaging devices for monitoring characteristics of the elongated material, such as diameter, weight, density, etc. These gaging devices generally have a narrow channel formed therewithin, through which channel the elongated material passes. If the enlarged section formed on the elongated material cannot pass through the channel of the gaging device, the movement of the elongated material can become jammed, and/or the gaging device can become damaged.

The above described problems are equally applicable to mill lines for other continuously moving elongated material, such as monofilament and multifilament yarn or bare wire, or any other like material.

OBJECTS OF THE INVENTION

It is therefore an object of this invention to detect an enlargement in a section of a continuously moving elongated material, such as monofilament or multifilament yarn or bare or insulated wire.

It is another object of this invention to provide detection of an enlarged section of a continuously moving line of material through a mill in order to shut down the line while the cause of the enlargement is corrected.

These and other objects of the invention will be pointed out in and understood from the following.

SUMMARY OF THE INVENTION

According to a broad aspect of the invention there is provided an apparatus for detecting an enlarged section of a continuously moving elongated material. The apparatus includes a sensor member, a flapper member, a spring, and a fluidic coupling device. The sensor member has an open ended slot therein dimensioned to allow all of the elongated material to pass therethrough except for the enlarged section to be detected; and the outer end of the sensor member has a relatively large opening which is contiguous with the open end of the slot for allowing the enlarged section of the elongated material to pass through the larger opening. The spring biases the sensor member in a direction opposite the direction of movement of the elongated material. The fluid coupling device has an input port for receiving a fluid jet, a first output port adjacent to the flapper member, and a second output port for coupling a portion of the fluid jet to a monitoring device, which portion is inversely proportional to the remainder of the fluid jet exiting the first output port. Means is also provided for mounting the sensor member to pivotally move when its slot is contacted by the enlarged section of the elongated material. The flapper member is mechanically coupled to the sensor member, and moves, in response to movement of the sensor member, away from the first output port, whereby the pressure of the fluid jet at the second output port decreases sufficiently to cause actuation of the monitoring device as the enlarged section of the elongated material moves through the larger opening adjacent the slot in the sensor member.

The mounting means further comprises a mounting frame, a dowel, a coupling member and a bracket. The coupling member is mechanically connected to the sensor and flapper members, and has a C-shaped channel therein for receiving a portion of the dowel as opposite ends of the dowel extend from opposite respective ends of the channel. The bracket, which is fixed to the mounting frame, has holes therein for receiving the opposite ends of the dowel. The sensor and flapper members are integrally formed with and extend from the coupling member, and are thus pivotally movable about the dowel and the coupling member.

DESCRIPTION OF THE PREFERRED EMBODIMENT

Referring to FIGS. 1 through 4, the invention will now be described.

Figure 1:
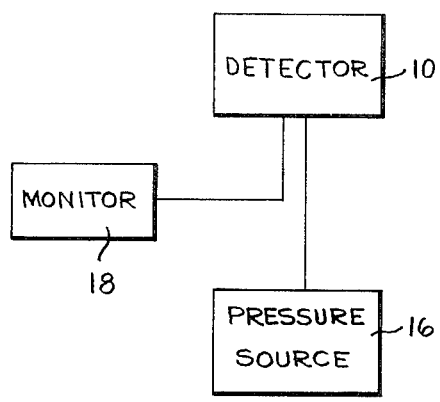
FIG. 1 is a block diagram showing an apparatus for detecting an enlarged section of the continuously moving elongated material, a pressure source and a monitor.
Figure 2:
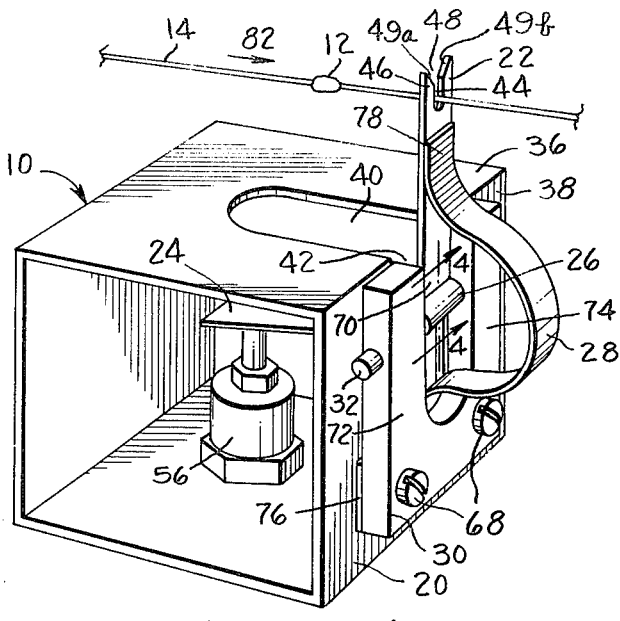
FIG. 2 is a perspective view of the apparatus for detecting an enlarged section of continuously moving material just prior to detection of the enlarged section.
Figure 3:
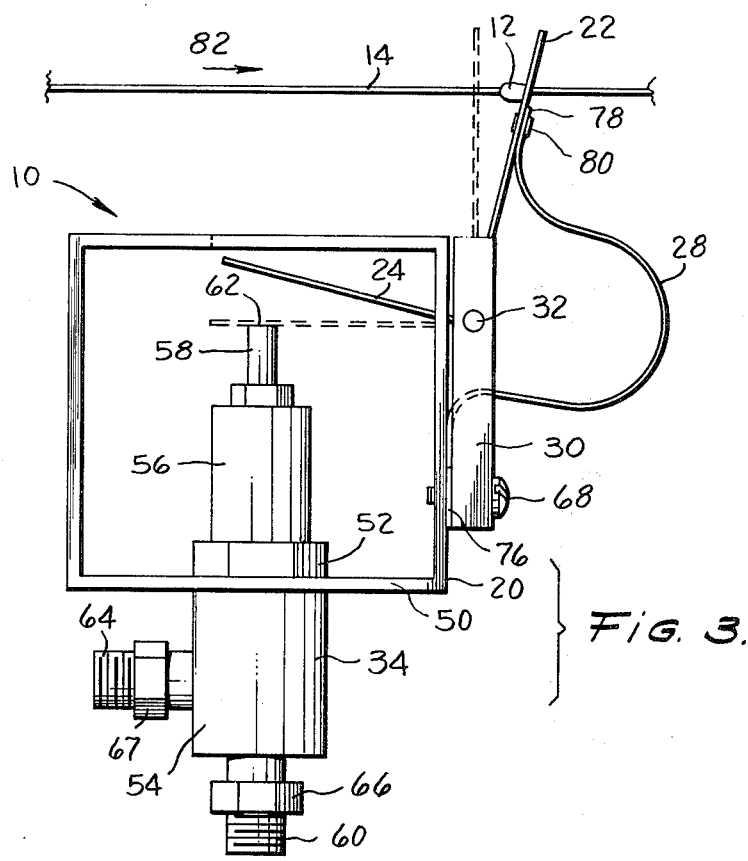
FIG. 3 is a front elevation view of the apparatus shown in FIG. 2 as the enlarged section is being detected.

An apparatus 10, hereinafter referred to as detector 10, for detecting an enlarged section 12 of a continuously moving elongated material 14, is shown in FIGS. 2 and 3. Detector 10 can be suitably positioned on a support (not shown) to provide satisfactory on-line monitoring of the elongated material. Material 14 can be comprised of any monofilament or multifilament yarn, insulated or bare wire, or any other similar material. As shown in block diagram in FIG. 1, a pressure source 16 supplies a fluidic jet to detector 10. The fluidic jet can be comprised of a suitable gas, such as air, which is fed to detector 10 via a standard flow restrictor (not shown). The value of this flow restrictor is selected so that the pressure of the fluid jet supplied to detector 10 is at a desired value. Detector 10 is fluidically coupled to a monitor 18 (shown in FIG. 1), which monitor is actuated upon detection of enlarged section 12 by detector 10. Detector 10, as shown in FIGS. 2 and 3, is comprised of a mounting frame 20, a sensor member 22, a flapper member 24, a C-shaped coupling member 26, a spring 28, a U-shaped mounting bracket 30, a dowel 32 and a fluidic coupling device 34.

Mounting frame 20 is rigid, and in this embodiment, is cube shaped, with its front and rear open. The respective top and side surfaces 36 and 38 of mounting frame 20 have respective contiguous openings 40 and 42 therein.

Figure 4:
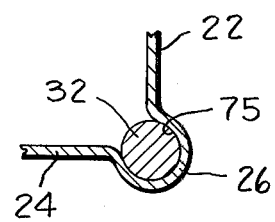
FIG. 4 is an enlarged fragmentary sectional view of the dowel, coupling member and portions of the sensor and flapper members along the plane of line 4—4 shown in FIG. 2.

Sensor and flapper members 22 and 24, in this embodiment are integral with and extend from opposite edges of coupling member 26, as shown in FIG. 4. The integral combination of sensor and flapper members 22 and 24 and coupling member 26 is in alignment with respective openings 40 and 42 in mounting frame 20. Flapper member 24 extends through opening 42 to the interior of mounting frame 20, while sensor member 22 extends upward beyond top and side surfaces 36 and 38 of mounting frame 20. Sensor member 22 has an open ended slot 44 formed adjacent that end 46 thereof which is distal from coupling member 26. End 46 of sensor member 22 has an enlarged opening 48 adjacent thereto which is contiguous with the open end of slot 44. Slot 44 is dimensioned to allow all of material 14 to pass therethrough except for enlarged section 12. Opening 48 is bounded by inclined surfaces 49a and 49b, and is dimensioned to confine the lateral movement and allow for passage therethrough of enlarged section 12. Flapper member 24 is dimensioned to allow it to pass through opening 40 in top surface 36 of mounting frame 20.

Fluidic coupling device 34 is mounted to a bottom side 50 of mounting frame 20, using a standard fitting 52. Fluidic coupling device 34 is comprised of a standard tube to pipe tee 54, a standard pipe cap 56, a barb tube fitting 58, a first input port 60, a first output port 62 and a second output port 64. One end of pipe cap 56 is fluidically coupled to tube to pipe tee 54, while the other end of pipe cap 56 is fluidically coupled to first output port 62. Input port 60 and second output port 64 are fluidically coupled to tube to pipe tee 54 via respective standard fittings 66 and 67. Pipe cap 56, barb tube fitting 58 and first output port 62 are located within mounting frame 20, while tube to pipe tee 54, first input port 60 and second output port 64 are located outside of mounting frame 20. First output port 62, which is located at that end of barb tube fitting 58 distal from pipe cap 56, is positioned adjacent flapper member 24. Input port 60 is fluidically coupled to pressure source 16, while second output port 64 is fluidically coupled to monitor 18 (shown in FIG. 1).

The integral combination of sensor member 22, flapper member 24 and coupling member 26 is a rigid structure, such that when the sensor member moves, the flapper member also simultaneously moves. This combination is pivotally mounted with respect to mounting frame 20 as follows. U-shaped mounting bracket 30 is fastened to side 38 of mounting frame 20 using standard fasteners 68. Coupling member 26 is positioned within a space 70 between respective legs 72 and 74 of mounting bracket 30. Coupling member 26 has a C-shaped channel 75 (shown in FIG. 4) for receiving a medial portion of dowel 32. Opposite ends of dowel 32 extend past coupling member 26 and through tight fitting holes (not shown) in respective legs 72 and 74 of mounting bracket 30. Thus, sensor member 22 and flapper member 24 are rotatably and pivotally mounted about dowel 32 and coupling member 26.

Spring 28 has one end 76 anchored between mounting bracket 30 and side 38 of mounting frame 20 via fasteners 68. The other end 78 of spring 28 is fixed to sensor member 22 using a standard fastener, such as a rivet 80 shown in FIG. 3. As elongated material 14 moves in the direction of an arrow 82, shown in FIGS. 2 and 3, spring 28 biases sensor member 22 (counterclockwise as shown in FIG. 3) in the direction opposite the direction of movement of elongated material 14, until the plane of the sensor is approximately parallel to side 38, of mounting frame 20, and flapper member 24 abuts or nearly abuts first output port 62 of coupling device 34.

The operation of detector 10 will now be explained. Prior to the detection of enlarged section 12, and while elongated material 14 is passing through slot 44 in sensor member 22, depending upon design requirements, flapper member 24 either abuts first output port 62 of fluidic coupling device 34, and thereby completely blocks it off, or flapper member 24 nearly abuts first output port 62 to allow the escape of a small portion at a nominal pressure of the total fluid jet which enters input port 60. If first output port 62 is completely blocked off, all of the fluid jet exits second output port 64 at a maximum pressure. If first output port 62 is partially blocked off, a small portion of the fluid jet exits therefrom, and the remainder of the fluid jet exits second output port 64 at a pressure which is almost equal to the pressure of the fluid jet entering input port 60. Under either circumstance, monitor 18 receives a high pressure signal and is in a set condition.

When enlarged section 12 contacts slot 44 of sensor 22, it is unable to penetrate therethrough and overcomes the biasing force of spring 28 to move sensor member 22 in the direction of movement of arrow 82, as shown in FIG. 3. As this occurs, flapper member 24 simultaneously moves away from first output port 62, and rotates with sensor member 22 in the clockwise direction, as shown in FIG. 3, until slot 44 in sensor member 22 is sufficiently displaced downward with respect to the elongated material that enlarged section 12 is positioned within opening 48 adjacent end 46 of sensor member 22, and the enlarged section is thus allowed to pass therethrough. The rotational movement of sensor member 22 is not restricted by flapper member 24, since flapper member 24 (as mentioned previously) is dimensioned to pass through opening 40 in top surface 36 of mounting frame 20. As flapper member 24 moves away from first output port 62, an increasing proportion of the fluid jet exits therefrom at an increasing pressure, while at the same time, a decreasing proportion of the fluid jet exits second output port 64 at a decreasing pressure, until, finally, the proportion of the fluid jet exiting second output port 64 and its output pressure are minimal. Monitor 18 senses the change in the pressure signal from output port 64, and provides an appropriate response to the detection of enlarged section 12 by detector 10.

Once enlarged section 12 has moved past sensor member 22, spring 28 again biases sensor member 22 in the direction opposite the direction of movement of elongated material 14 towards its initial position. Flapper member 24 also simultaneously returns to its initial position, and again causes the complete or partial blocking of first output port 62 of fluidic coupling device 34. As the fluid jet is again either completely, or nearly completely prevented from exiting first output port 62, the proportion of fluid jet exiting output port 64 increases until the output pressure signal sensed by monitor 18 reaches its maximum value, and the monitor is reset.

Monitor 18 can be comprised of a variety of elements depending upon the desired response required from it. For example, if it were desired that the mill line be shut down upon detection of elongated section 12, monitor 18 can be comprised of a pressure sensitive electrical switch which closes upon detection of the elongated section, and causes a circuit breaker, which is in series with the power driving the mill line, to open, thereby resulting in the shutting down of the mill line. Alternatively, the closing of the pressure sensitive switch could trigger a visual or audible alarm, which alarm is actuated by an annunciator circuit, to alert a supervisor that a fault has been detected, and that the mill line should be shut down until the condition causing the fault is corrected. Similarly the closing of the pressure sensitive switch, if desired, could be used as a trigger signal for actuating a counter, and/or marking means so that a record can be kept of the number of locations of detected enlarged sections.

When it is desired that the mill line should continue operating at least temporarily, after detection of an enlarged section of the elongated material, gaging plates of fluidic gaging devices, which can be located downstream of the detector, should be moved out of contact with the elongated material, to prevent their being damaged by engagement with the advancing enlarged section of the elongated material. Under these circumstances, monitor 18 can be comprised of a 3-way valve and a pneumatic spring actuator. When the elongated material is comfortably passing through detector 10, the high pressure signal from second output port 64 actuates the 3-way valve, and another pneumatic signal passes therethrough to pressurize the pneumatic actuator. The pressurized pneumatic actuator maintains the gaging plates of the fluidic gaging device on line, and in contact with the continuously moving elongated material. Upon detection of an enlarged section by detector 10, the pressure signal from second output port 64 falls to a minimal value, and the 3-way valve opens causing deactuation of the pneumatic actuator. Deactuation of the pneumatic actuator then results in the gaging plate of the fluidic gaging device being removed from the mill line.

At this point it should be noted that all the components of detector 10 can be comprised of a suitable durable material such as aluminum. However, sensor member 22 should be hard and wear resistant, since it is in constant contact with the continuously moving elongated material. One such suitable hard, wear resistant material is anodized aluminum.

Although the invention has been described with reference to a specific embodiment thereof, numerous modifications are possible without departing from the invention, and it is desirable to cover all modifications falling within the spirit and scope of this invention.

What we claim as new and desire to secure by letters patent of the United States is:

1. An apparatus for detecting an enlarged section of a continuously moving elongated material comprising:
   a. a sensor member having an open ended slot dimensioned to allow all of the elongated material to pass therethrough except for the enlarged section, one end of said sensor member having a relatively larger opening therein contiguous with the open end of the slot for allowing the enlarged section of the elongated material to pass therethrough and out of the slot;
   b. a flapper member mechanically coupled to said sensor member and movable in response to movement of said sensor member;
   c. means for biasing said sensor member in a direction opposite to the direction of movement of the elongated material;
   d. a fluidic coupling device having an input port for receiving a fluid jet, a first output port adjacent said flapper member, and a second output port for coupling a portion of the fluid jet to a monitoring device in inverse proportion to the remainder of the fluid jet exiting the first output port; and
   e. means for mounting said sensor member to pivotally move when said sensor member is contacted by the enlarged section of the elongated material which is not passable through said slot and until the enlarged section can pass through the enlarged opening in said one end of said sensor member, said mounting means comprising:
      i. a dowel;
      ii. a coupling member mechanically connected to said sensor member and said flapper member, and having a channel therein for receiving a portion of said dowel as opposite ends of said dowel extend from opposite respective ends of said channel; and
      iii. means for receiving said opposite ends of and supporting said dowel, whereby said sensor and flapper memebers are pivotally movable about said dowel and said coupling member, and said flapper member moves, simultaneously with said sensor member, with respect to the first output port of said fluidic coupling device, thereby causing a change in pressure at the first and second respective output ports, the change in pressure at the second output port being sufficient to cause actuation of the monitoring device as the enlarged section of the elongated material moves through the enlarged opening in said one end of said sensor member.

2. An apparatus for detecting an enlarged section of a continuously moving elongated material according to claim 1, wherein said sensor member and said flapper member are integrally formed with and extend from said coupling member.

3. An apparatus for detecting an enlarged section of a continuously moving elongated material according to claim 1, wherein said biasing means is comprised of a spring having one end anchored between said mounting frame and said bracket, and said spring having another end attached to said sensor member to bias said sensor member in the direction opposite the direction of movement of the elongated material.

4. An apparatus for detecting an enlarged section of a continuously moving elongated material according to claim 1, wherein said flapper member presses against and blocks the first output port of said fluidic coupling device while the elongated material is moving through the slot in said sensor member, whereby the fluid jet exiting the second output port of said fluidic coupling device is at a maximum pressure, and when an enlarged section of the elongated material contacts the slot in said sensor member, said flapper member moves away from and unblocks the first output port to cause a decrease in the pressure of the fluid jet exiting the second output port of said fluidic coupling device.

5. An apparatus for detecting an enlarged section of a continuously moving elongated material according to claim 1, wherein said channel of said coupling member is C-shaped.

6. An apparatus for detecting an enlarged section of a continuously moving elongated material according to claim 1, wherein said receiving and supporting means is comprised of:
 a. a mounting frame; and
 b. a bracket affixed to said mounting frame, said bracket having holes therein for receiving said opposite ends of said dowel.

* * * * *